Oct. 18, 1938.  G. B. BENTZ  2,133,416
FOLDABLE CLOSET SEAT DEFLECTOR
Filed Feb. 21, 1938  2 Sheets-Sheet 1
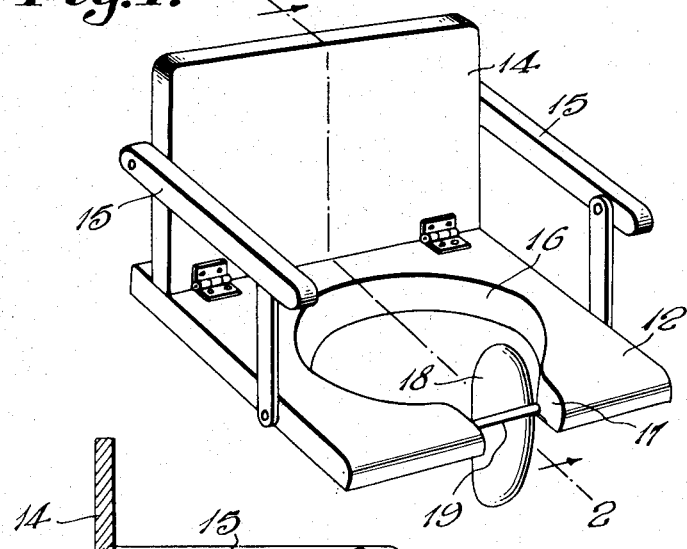
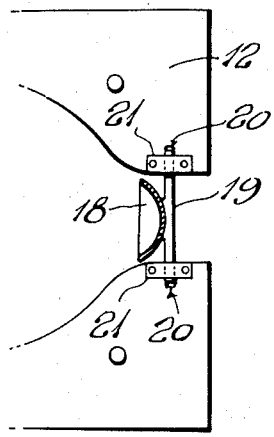
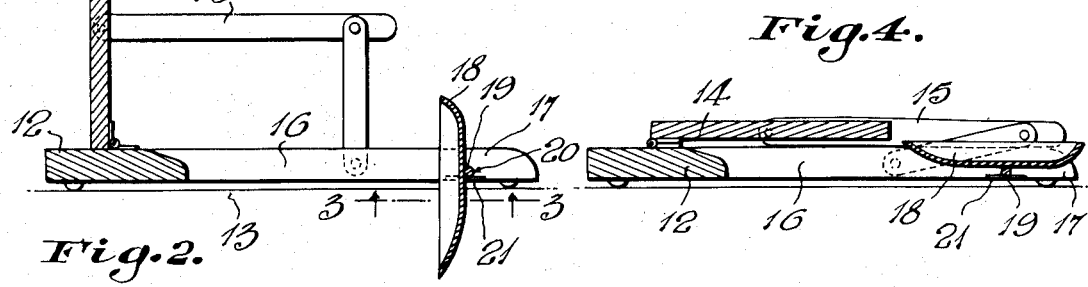
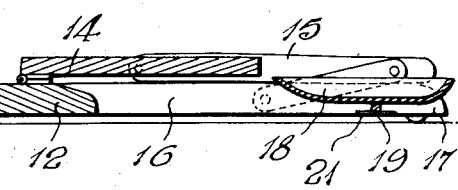
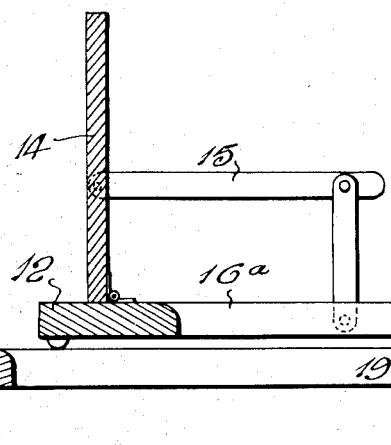
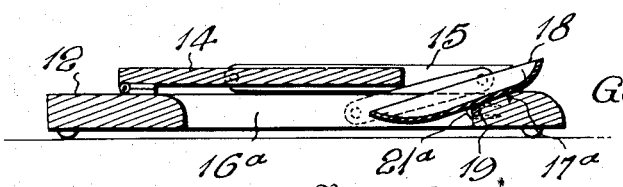
Inventor
George B. Bentz Oct. 18, 1938.       G. B. BENTZ       2,133,416
FOLDABLE CLOSET SEAT DEFLECTOR
Filed Feb. 21, 1938     2 Sheets-Sheet 2
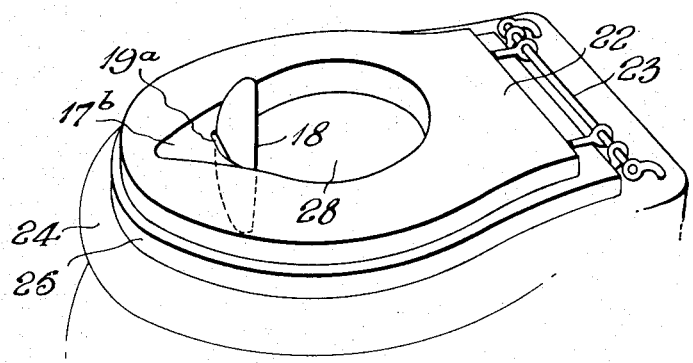
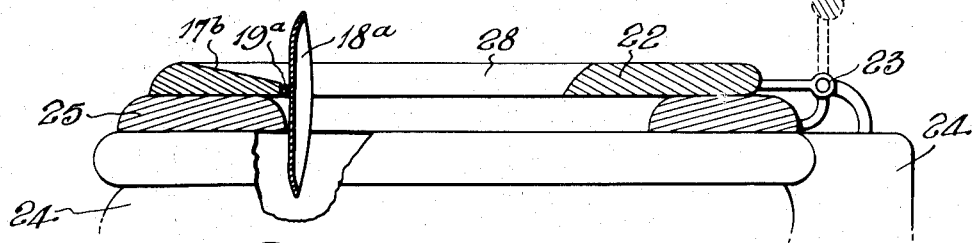
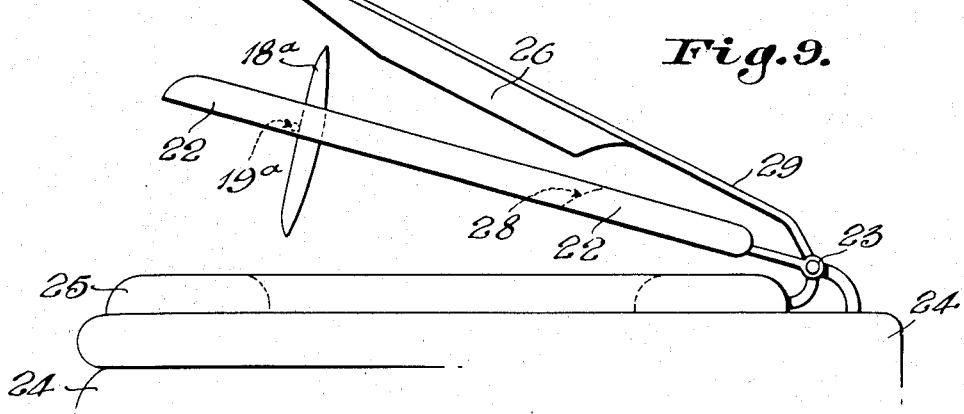
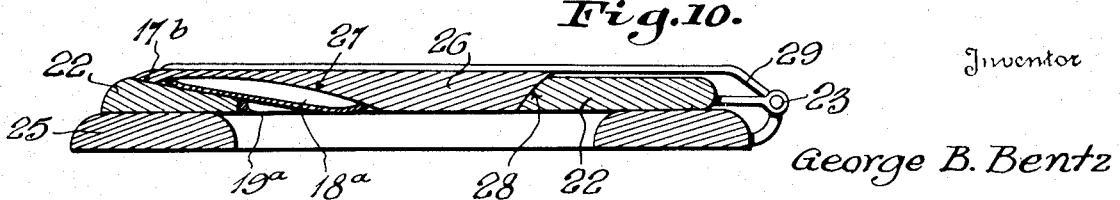
Inventor
George B. Bentz Patented Oct. 18, 1938

2,133,416

UNITED STATES PATENT OFFICE 2,133,416

FOLDABLE CLOSET SEAT DEFLECTOR

George B. Bentz, New York, N. Y.

Application February 21, 1938, Serial No. 191,830

5 Claims. (Cl. 4—239)

The invention relates to improvements in deflectors to prevent small children from urinating upon and over the front portions of closet seats, whether these seats be those ordinarily mounted upon closet bowls for use by adults, or smaller seats for children's use.

The principal object of the invention is to provide an effective deflector mounted in such manner at the inner front portion of the seat that it may readily be swung from a substantially vertical operative position to an out-of-the-way position. Thus, when the deflector is mounted upon a seat which is in turn pivotally mounted upon a closet bowl, said deflector will not interfere with movement of the seat to its usual raised position, and when the deflector is mounted upon a child's seat which is merely placed upon the usual seat when needed, said deflector will not occupy unnecessary space when the seat is not in use, this being of particular advantage if the seat be provided with a foldable back and with foldable arm rests to produce a compact article when not in operative position.

A further object is to provide a construction which may be easily and inexpensively manufactured and marketed and sold at a profit at a reasonable price.

With the foregoing in view, the invention resides in the novel subject matter hereinafter described and claimed, description being accomplished by reference to the accompanying drawings.

Fig. 1 is a perspective view showing a child's seat with a foldable back and arm rests and provided with the deflector.

Fig. 2 is a vertical sectional view on line 2—2 of Fig. 1.

Fig. 3 is a detail horizontal sectional view on line 3—3 of Fig. 2.

Fig. 4 is a view similar to Fig. 2 but showing the back, the arm rests and the deflector in folded positions.

Fig. 5 is a view similar to Fig. 2 but showing the deflector mounted on a child's seat having an opening, the wall of which is continuous, whereas the opening in Figs. 1 to 4 is contracted at its front end and opens through the front end of the seat.

Fig. 6 is another sectional view showing the construction of Fig. 5 in folded position.

Fig. 7 is a perspective view showing the deflector on a child's seat which is permanently pivoted on a closet bowl to swing to and from the adult's seat.

Fig. 8 is a sectional view partly in elevation of the construction shown in Fig. 7, the child's seat being raised in dotted lines.

Fig. 9 is a side elevation showing a construction very similar to that illustrated in Figs. 7 and 8 but showing also a cover for the child's seat.

Fig. 10 is a sectional view through the construction shown in Fig. 9, the child's seat being lowered upon the adult's seat and the cover being lowered upon said child's seat and the folded deflector.

In Figs. 1 to 6 inclusive, a child's seat 12 is shown to rest when needed upon the conventional adult's seat 13, a foldable back 14 is connected with the rear portion of said seat 12, and foldable arm rests 15 are also provided. In Figs. 1 to 4, the opening 16 in the seat 12 is contracted at its front end as shown at 17, and opens through the front end of the seat. In Figs. 5 and 6, however, the seat opening 16ª is provided with a continuous edge wall. The deflector 18 is mounted either in the contracted end 17 of the opening 16 or at the front portion of the opening 16ª, said deflector in either instance being pivotally mounted on a transverse axis to permit it to swing from a substantially vertical operative position (Figs. 1, 2 and 5) to a substantially horizontal out-of-the-way position (Figs. 4 and 6). In the construction shown in Figs. 1 to 4, the recess in the seat, formed by the contracted front end 17 of the opening 16, receives a portion of the deflector 18 when the latter is in its out-of-the-way position, as seen in Fig. 4. In Figs. 5 and 6, however, the upper portion of the seat 12 is recessed at 17ª to receive a portion of said deflector when the latter is moved to said out-of-the-way position.

The deflector 18 is preferably vertically elongated and of concavo-convex form, said deflector being constructed from metal, rubber, or other desired material. In the present showing, a short shaft 19 extends across the front of the deflector 18 and is suitably secured thereto. The ends of this shaft may be pivotally connected with the seat 12 in any preferred manner. In the form of construction shown in Figs. 1 to 4, the shaft ends extend into grooves 20 in the lower side of the seat and are held therein by metal plates 21 which span said grooves and are secured to the seat. In Figs. 5 and 6, suitable bearings 21ª are shown for the shaft 19, and these bearings may be in the form of staples or the like.

In Figs. 7 to 10 inclusive, a child's seat 22 is pivotally mounted at 23 upon a closet bowl 24 to swing downwardly onto the conventional adult's seat 25 when needed, and in Figs. 9 and 10, a suitable cover 26 is provided for said seat 22. The deflector 18ᵃ is pivotally mounted at 19ᵃ to swing from the operative position shown in Figs. 7 and 8 to the out-of-the-way position shown in Fig. 10 and in dotted lines in Fig. 8. The upper portion of the seat 22 is recessed at 17ᵇ to receive the upper portion of the deflector 18ᵃ when the latter is in its out-of-the-way position, and the cover 26 is recessed at 27 to receive said deflector. This cover 26 may well be in the form of a plug to fit into the seat opening 28, said plug being carried by one or more arms 29 pivotally mounted on the bowl 24.

From the foregoing taken in connection with the accompanying drawings, it will be seen that novel and advantageous provision has been made for carrying out the objects of the invention. While preferred features have been illustrated, it is to be understood that variations may be made within the scope of the invention as claimed.

I claim:—

1. A urine deflector comprising a channeled deflecting member disposed at the inner front portion of a closet seat and normally extending both upwardly and downwardly from said seat, the channel of said member being disposed rearwardly, and means pivotally mounting said member on the seat, the pivotal axis of said mounting means being disposed transversely of said seat and member and being located between the upper and lower ends of the latter, said member being swingable about said axis to a substantially horizontal position when not in use.

2. A structure as specified in claim 1; said front portion of the seat being provided with a recess which receives a portion of said deflecting member when the latter occupies said substantially horizontal position.

3. A urine deflector comprising a channeled urine deflecting member disposed in the contracted front end of a closet seat opening and normally extending both upwardly and downwardly from the seat, and pivotal means connecting said deflecting member with said seat and mounting said member to swing from a substantially vertical operative position to a substantially horizontal position substantially within said opening.

4. A urine deflector comprising a channeled urine deflecting member disposed behind the front portion of a closet seat and normally extending both upwardly and downwardly from said seat, and means mounting said member on said seat upon a transverse pivotal axis, permitting said member to swing from a substantially vertical operative position to a substantially horizontal position, one side of said seat being provided with a recess which receives a portion of said deflecting member when the latter occupies said substantially horizontal position.

5. A urine deflector for a closet seat having a hinged cover, comprising a channeled urine deflecting member disposed at the inner front portion of the seat and normally extending both upwardly and downwardly therefrom, means mounting said deflecting member on said seat upon a transverse pivotal axis, permitting said member to swing from a substantially vertical operative position to a substantially horizontal position, the seat and cover being both recessed to receive a portion of said deflecting member when the latter occupies said substantially horizontal position.

GEORGE B. BENTZ.